United States Patent
Shimonishi et al.

(10) Patent No.: US 12,535,524 B1
(45) Date of Patent: Jan. 27, 2026

(54) SYSTEM AND APPARATUS FOR TESTING MAGNETORESISTIVE RANDOM ACCESS MEMORY (MRAM) DEVICES

(71) Applicant: Keysight Technologies, Inc., Santa Rosa, CA (US)

(72) Inventors: Sumio Shimonishi, Inagi (JP); Ryo Suzuki, Hachioji (JP)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 292 days.

(21) Appl. No.: 18/379,702

(22) Filed: Oct. 13, 2023

(51) Int. Cl.
| | |
|---|---|
| *G01R 31/302* | (2006.01) |
| *G01C 3/02* | (2006.01) |
| *G01K 3/00* | (2006.01) |
| *G01K 7/02* | (2021.01) |
| *G01R 15/20* | (2006.01) |
| *G01R 27/08* | (2006.01) |

(52) U.S. Cl.
CPC ............. *G01R 31/302* (2013.01); *G01C 3/02* (2013.01); *G01K 3/005* (2013.01); *G01K 7/02* (2013.01); *G01R 15/202* (2013.01); *G01R 27/08* (2013.01)

(58) Field of Classification Search
CPC .... G01R 31/302; G01R 15/202; G01R 27/08; G01C 3/02; G01K 3/005; G01K 7/02
See application file for complete search history.

(56) References Cited

U.S. PATENT DOCUMENTS

| | | | |
|---|---|---|---|
| 6,898,113 B2* | 5/2005 | Tsuji | G11C 29/70 365/158 |
| 6,909,631 B2* | 6/2005 | Durlam | G11C 11/15 365/158 |
| 7,165,197 B2 | 1/2007 | Park et al. | |

(Continued)

FOREIGN PATENT DOCUMENTS

| | | |
|---|---|---|
| JP | 2021128954 A | 9/2021 |
| JP | 2021128955 A | 9/2021 |

(Continued)

OTHER PUBLICATIONS

Raphael Robertazzi et al., "Analytical MRAM Test," 2014 International Test Conference, Seattle, WA, USA, 2014, pp. 1-10.

(Continued)

*Primary Examiner* — Giovanni Astacio-Oquendo
*Assistant Examiner* — Haidong Zhang

(57) ABSTRACT

A system and method for measuring a resistance (R)-magnetic field (H) curve of a magnetoresistive random-access memory (MRAM) device is described. The system includes a calibration fixture adapted to provide initial measured magnetic field data for setting a measured distance and a coil current of a coil of an electromagnet for a plurality of magnetic field strengths at a plurality of predetermined distances from an end surface of the electromagnet; a power supply adapted to provide a coil current to the electromagnet; and a laser displacement meter adapted to measure a distance from the end surface of the electromagnet to a device under test (DUT). The electromagnet is adapted to (Continued)

generate magnetic fields at a predetermined magnetic field sweep interval within a magnetic field sweep range from a value of a first magnetic field strength to a value of a second magnetic field strength.

19 Claims, 11 Drawing Sheets

(56) References Cited

U.S. PATENT DOCUMENTS

| | | | |
|---|---|---|---|
| 2005/0102581 A1* | 5/2005 | Abraham | G11C 11/16 714/42 |
| 2012/0016614 A1* | 1/2012 | Hohe | G01R 33/075 324/202 |
| 2019/0137543 A1 | 5/2019 | Eo et al. | |
| 2022/0050136 A1 | 2/2022 | Watanabe et al. | |
| 2022/0050138 A1 | 2/2022 | Watanabe et al. | |

FOREIGN PATENT DOCUMENTS

| | | |
|---|---|---|
| KR | 20190051240 A | 5/2019 |
| WO | 2021/161644 A1 | 8/2021 |
| WO | 2021/161645 A1 | 8/2021 |

OTHER PUBLICATIONS

"Magnetic Automated Test Equipment," Products-Hprobe GmbH, retreived on Nov. 30, 2022, https://www.hprobe.com/products/#ibex, pp. 1-12.

"5203 Vertical Projected Field," GMW Associates, retreived on Nov. 30, 2022, https://gmw.com/product/5203/, 1-7 pgs.

"4080 Series of Parametric Testers," Keysight Technologies, Dec. 1, 2017, https://www.keysight.com/jp/ja/assets/7018-01633/brochures/5989-7089.pdf, 1-12 pgs.

"Challenges and Solutions for Material Science/Engineering Testing Applications," Keysight Technologies, Dec. 1, 2017, https://www.keysight.com/jp/ja/assets/7018-05013/technical-overviews/5992-1182.pdf, pp. 1-35.

* cited by examiner

SYSTEM AND APPARATUS FOR TESTING MAGNETORESISTIVE RANDOM ACCESS MEMORY (MRAM) DEVICES

BACKGROUND

Magnetoresistive random-access memory (MRAM) is a type of non-volatile random-access memory which stores data in magnetic domains.

Unlike conventional RAM chip technologies, data in MRAM is not stored as electric charge or current flows, but by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a magnetic tunnel junction and is the simplest structure for an MRAM bit. A memory device is built from a grid of such "cells".

One way of reading is accomplished by measuring the electrical resistance of the cell. A particular cell is typically selected by powering an associated transistor that switches current from a bit line through the cell to a source line. Because of tunnel magnetoresistance, the electrical resistance of the cell changes with the relative orientation of the magnetization in the two plates. By measuring the resulting current, the resistance inside any particular cell can be determined, and from this the magnetization polarity of the writable plate. Typically if the two plates have the same magnetization alignment (low resistance state) this is considered to mean "0", while if the alignment is antiparallel the resistance will be higher (high resistance state) and this means "1."

Data are written to the cells using a variety of means. In the simplest "classic" design, each cell lies between a pair of write lines arranged at right angles to each other, parallel to the cell, one above and one below the cell. When current is passed through them, an induced magnetic field is created at the junction, which the writable plate picks up. This pattern of operation is similar to magnetic-core memory, a system commonly used in the 1960s.

Semiconductor wafers are tested during manufacturing For a magnetic tunnel junction (MTJ) that determines the performance of MRAM devices, it is important to measure their characteristics in a parametric test. In particular, the measurement of an RH curve, where R represents a resistance and H represents a magnetic field (units: A/m), provides information relating to logic-level margins and long-term reliability.

Known MRAM test systems suffer from certain drawback and shortcomings. For example, certain known systems takes a significant time (about a day) to prepare magnetic field calibration and perform measurements involved that the magnitude of a magnetic field applied to a device under test (DUT) that are not accurate.

What is needed, therefore, is a system and method for testing MRAM that overcome at least the drawbacks of known devices described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
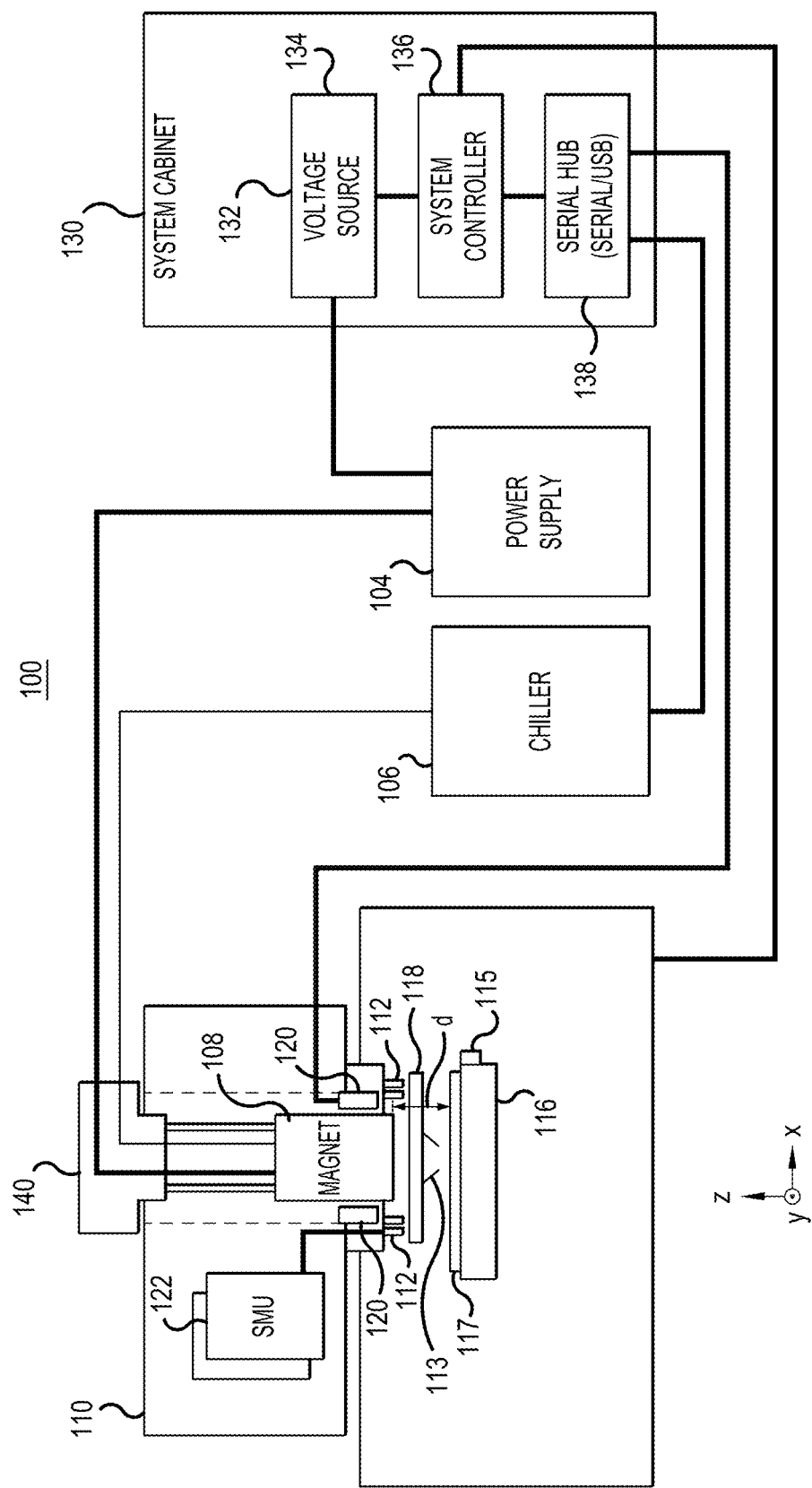
FIG. 1 is a simplified block diagram of a system for MRAM testing in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, the present teachings provide a system and method for testing MRAM semiconductor wafers and MRAM devices thereof. In accordance with various representative embodiments, a system and method for MRAM testing are described. As will become clearer as the present description continues, an electromagnet and electromagnet-related apparatus (electromagnet subsystem) are components of a parametric testing device. For purposes of illustration, the parametric testing system may comprise the Keysight Technologies 4080 Series ('4080 system') of parametric testing system, to thereby provide a system for controlling the MTJ of an MRAM device in a magnetization direction thereof and measuring an RH curve. The 4080 system is commercially available from Keysight Technologies, Inc., Santa Rose, CA (USA), and is disclosed, for example, in product brochure Keysight Technologies 4080 Series of Parametric Testers (2017). The entire disclosure of this brochure is specifically hereby incorporated by reference herein. With this system, the various representative embodiments of the present teachings collectively provide, among other benefits and advantages, incorporation of an electromagnet into a test head of the 4080 system (4080 TH), position adjustment of the electromagnet, calibration of an applied magnetic field, creation of software for measurement, high reproducibility of measurement, high correlation between a plurality of systems, maintenance of a mass production system, and a safety mechanism. Among other improvements to the field of measurement and testing of semiconductor wafers, the system and method of the present teachings reduce the need for calibration and maintenance needed performed by the end-user that plagues certain known devices. Accordingly, and beneficially the labor to be performed by the end-used before a test of the MRAM device is significantly reduced. This provides a practical application of improved testing of MRAM wafer/device with reduced labor input before, during and after completion of an MRAM test.

In accordance with a representative embodiment, a system for measuring a resistance (R)-magnetic field (H) curve of a magnetoresistive random-access memory MRAM device is described. The system comprises: a calibration fixture adapted to provide initial measured magnetic field data for setting a measured distance and a coil current of a coil of an electromagnet for a plurality of magnetic field strengths at a plurality of predetermined distances from an end surface of the electromagnet; a power supply adapted to provide a coil current to the electromagnet; and a laser displacement meter adapted to measure a distance from the end surface of the electromagnet to a device under test (DUT). The electromagnet is adapted to generate magnetic fields at a predetermined magnetic field sweep interval within a magnetic field sweep range from a value of a first magnetic field strength to a value of a second magnetic field strength, and sweep back and forth between the first magnetic field strength and the second magnetic field strength. The system also comprises a test head comprising source measurement unit (SMU) adapted to determine, for each of magnetic field strengths of the generated magnetic fields, a resistance of the DUT from a value a current measured from the DUT, and to set a value of the predetermined voltage that has been applied to a DUT therebetween; a processor; and a memory that stores instructions, which when executed by the processor, causes the processor to: determine a resistance value of a magnetic tunnel junction of the DUT from a value of the measured current and a setting value of the predetermined voltage that has been applied; and measure the RH curve from the resistance value of the DUT for each of the magnetic field strengths; and generate the magnetic fields by setting the coil current by determining, from the initial values, coil current values of the coil to be caused to flow through the coil of the electromagnet of the plurality of magnetic field strengths at the plurality of predetermined distances from the end surface of the electromagnet.

In accordance with another representative embodiment, a method measuring a resistance-magnetic (RH) field curve of a magnetoresistive random access memory (MRAM) is described. The method comprises: measuring initial values of a coil current flowing through a coil of an electromagnet for a plurality of magnetic field strengths at a plurality of predetermined distances from an end surface of the electromagnet; measuring a distance from the end surface of the electromagnet to a DUT through use of a laser displacement meter; generating magnetic fields at a predetermined magnetic field sweep interval within a magnetic field sweep range from a value of a first magnetic field strength to a value of a second magnetic field strength, and sweeping back and forth between the first magnetic field strength and the second magnetic field strength. Generating the magnetic fields comprises setting the coil current, which is determined with the initial value at the predetermined distances to the DUT from the end surface of the electromagnet. The method further comprises determining a resistance value of a magnetic tunnel junction of the DUT from a value of the measured current and a setting value of the predetermined voltage that has been applied; and determining the RH curve from the resistance value of the DUT for each of the magnetic field strengths.

FIG. 1 is a simplified block diagram of a system 100 for MRAM testing in accordance with a representative embodiment. The system 100 comprises a system cabinet 102, power supply 104, a chiller 106 and an electromagnet 108. Notably, in accordance with the present teachings, the power supply 104, the chiller 106 and the electromagnet 108 comprise an electromagnet subsystem. As described more fully herein, the power supply 104 provides current to the coils (not shown) of the electromagnet 108. The chiller 106 provides cooling fluid to maintain the electromagnet at a proper operating temperature.

As shown, the electromagnet 108 is installed in the vicinity of a probe card 118 with pogo pins 112 disposed between a test head (TH) 110 and the probe card 118. As described more fully herein, a magnetic field is applied to a wafer 117 of a magnetoresistive random access memory (MRAM) device disposed over a prober chuck 116 in an automatic wafer prober to measure an RH curve, where R represents a resistance and H represents a magnetic field (unit: A/m), of a magnetic tunnel junction (MTJ) of the MRAM device of the wafer 117. The electromagnet is installed in a center hole (not shown in FIG. 1), which vertically extends completely through the center of a test head (referred to as "TH") of the semiconductor parametric test system such as the Keysight 4080 Series system described above. As such, and as will become clearer as the description of the system 100 continues, the electromagnet subsystem is added to the semiconductor parametric test system with other components of the system 100 being part of the semiconductor parametric test system.

The electromagnet 108 is supported by an electromagnet position adjustment mechanism 140. The electromagnet 108 is adjusted using intermediation of support columns as described more fully in connection with a representative embodiment depicted in FIG. 3 and described more fully below. The electromagnet position adjustment mechanism 140 is fixed to a casing of the TH 110 or fixed to a manipulator that holds the TH 110. An end surface of the electromagnet, which is an end surface opposite to the other end surface facing to the electromagnet position adjustment mechanism 140 of the electromagnet 108, has an initial position with respect to the TH 110 adjusted by the electromagnet position adjustment mechanism in terms of a position in a coordinate system $(x,y,z,\theta)$ as described more fully below. In this case, the x-axis and the y-axis in the coordinate system of FIG. 1 are coordinate axes extending in a horizontal direction with respect to an upper surface of the prober chuck 116 perpendicularly to each other, with the z-axis being a coordinate axis extending in the vertical direction with respect to an XY-plane from the prober toward the electromagnet. As will become clearer as the present description continues, $\theta$ represents an angle indicating an inclination of the end surface of the electromagnet 108 with respect to the XY-plane. A distance "d" represents a distance from the end surface of the electromagnet 108 to a surface of the wafer 117, and can be measured and set by a method of a representative embodiment described more fully below.

Laser displacement meters 120 are provided on the probe head side of the TH 110 as shown. Illustratively, the laser displacement meters are installed at four locations on an inner wall of the center hole having a circular cross-section thereof. As described more fully herein, the laser displacement meters 120 are adapted a distance to a target object (the upper surface of the prober chuck 116, which locates the wafer 117 from the electromagnet 108 at four substantially symmetrical points on the circumference to determine the distance between the end surface of the electromagnet 108 and a DUT on the wafer. The positioning of the probe card 118 for wafer contact is controlled using needles 113. The needles 113 are provided under the probe card 118 through intermediation of an existing docking mechanism (for example, pogo pins 112) of the TH 110 including touch pads on the wafer 117 at predetermined positions. In accordance with such control, the prober chuck 116 in the prober has prober coordinates managed so that position control is performed in XYZ-directions of the coordinate system of FIG. 1. A chuck camera 115 is installed at one end portion of the chuck, and as described more fully below is used for the position control by viewing or acquiring an image of the target object faced by the chuck camera 115.

As noted above, the electromagnet 108 is connected to power supply 104 that supplies coil current to power the magnet and a chiller 106 that provides coolant fluid. Illustratively, there are two coil current lines provided to an internal coil. The chiller supplies coolant illustratively through two coolant supply lines in/out of the electromagnet 108.

A system cabinet 130, which is illustratively a component of the parametric test system (e.g., a Keysight 4080 series system) comprises a voltage source 134 that provides an operating voltage to the power supply 104 for the electromagnet 108, and the power supply for the magnet causes a current to flow through the coil of the electromagnet based on the control voltage (two lines of IN/OUT are provided for the coil current).

In accordance with a representative embodiment, the power supply 104 for the electromagnet 108 is illustratively a bipolar power supply whose rise time and overshoot of the coil current when changing the current setting value is optimized for an application of RH measurement, and can supply a current of approximately 40 A to the coils of the electromagnet 108. An output current value is set by inputting a control voltage from the semiconductor parametric tester. Just by way of example, the a signal source such as a Keysight B2901B source measure unit may be used and is incorporated, for example into the system cabinet 130 and is controlled by the user through a system controller 136 described below.

While the noted output current value of the power supply 104 for the electromagnet is not intended to limit the present teachings, but is not intended to be limiting, currents of this magnitude can pose a safety risk. To this end, as a current of as much as 40 A flows through the electromagnet 108 in order to generate a magnetic field of suitable magnitude, and a large amount of heat is generated. Thus, it is required to ensure safety of the system for a user. In accordance with a representative embodiment, two interlocks are contemplated to improve safety. A thermocouple (not shown) may be attached to the coil in the electromagnet 108 as the portion of the coil of the electromagnet that is predicted to exhibit the highest temperature. When the temperature of the coil reaches or exceeds a predetermined temperature, the system 100 is stopped. This termination of operation may be provided by hardware components when a signal from the thermocouple reaches the threshold temperature. Notably, the first interlock stops the system 100 without using software. A second interlock is based on monitoring whether or not the chiller 106 is constantly supplying the coolant to the electromagnet at an appropriate flow rate to maintain the temperature at the desired operating point. When the flow rate falls below a specified amount, the system 100 is stopped. Again, stopping operation may be realized only by hardware components when a signal from the chiller indicates the proper level of supplying coolant is not maintained. Notably, an emergency off (EMO) controller may also be provided and may be automatically, or manually activated when the temperature and coolant flow rates are improper.

The system controller 136 is also provided in the system cabinet 130, and is connected through a serial hub (e.g., a serial/USB) that connects the controller to the chiller 106, the laser displacement meter 120 and perform data acquisition therefrom. Moreover, the system controller 136 is adapted to effect many of the functions of the RH measurement of the MRAM of the DUT as described more fully below. As such, the system controller 136 may be a computer comprising a processor and a memory or tangible, non-transitory computer-readable medium that stores executable computer code ("instructions") to carry out certain aspects of the methods described more fully herein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 152 is an article of manufacture and/or a machine component. The processor 152 is configured to execute software instructions to perform functions as described in the various embodiments herein. The processor may be a general-purpose processor or may be part of an application specific integrated circuit (ASIC). The processor may also be a microprocessor, a microcomputer, a processor chip, a controller, a microcontroller, a digital signal processor (DSP), a state machine, or a programmable logic device. The processor may also be a logical circuit, including a programmable gate array (PGA), such as a field programmable gate array (FPGA), or another type of circuit that includes discrete gate and/or transistor logic. The processor may be a central processing unit (CPU), a graphics processing unit (GPU), or both. Additionally, any processor described herein may include multiple processors, parallel processors, or both. Multiple processors may be included in, or coupled to, a single device or multiple devices. The term "processor" as used herein encompasses an electronic component able to execute a program or machine executable instruction. References to the system controller 136 comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The system 100 further comprises a plurality of source measure units (SMUs) 122 disposed in TH 110 and/or can be disposed in the system cabinet 130. In accordance with a representative embodiment, the SMUs 122 are adapted to supply a voltage and measure a current substantially simultaneously, or can supply a current and measure a voltage substantially simultaneously.

Figure 2:
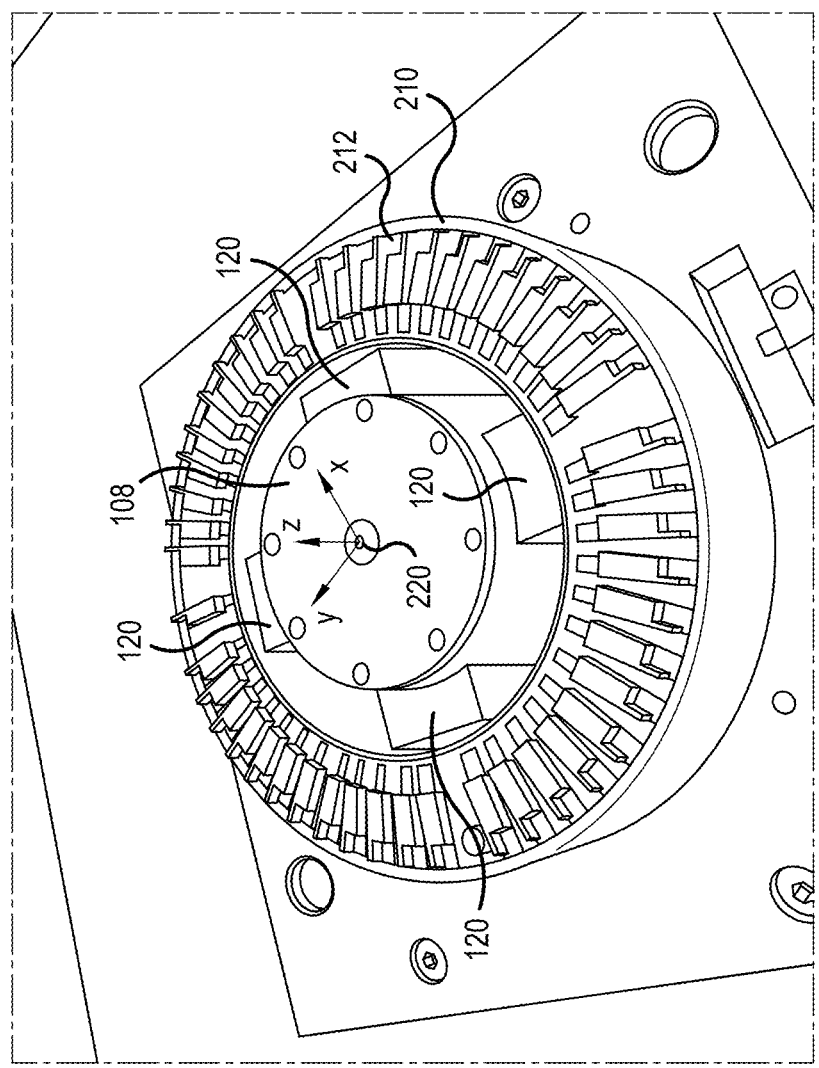
FIG. 2 is a perspective view of a top of an electromagnet used in a system for MRAM testing in accordance with a representative embodiment.

FIG. 2 is a perspective view of a top of electromagnet 108 of FIG. 1 used in the system 100 for MRAM testing in accordance with a representative embodiment. Various aspects of the electromagnet 108 shown in FIG. 2 are common to those described above, and may not be repeated to avoiding obscuring the presently described representative embodiment.

As shown in FIG. 2, laser displacement meters 120 are disposed around the perimeter of the electromagnet 108 and are surrounded by a plurality bushings 212 in a housing 200. A center 220 is also shown in the electromagnet 108. As alluded to above, and as describe more fully below, the center 220 is aligned with a center of the TH 110 with the end surface of the electromagnet 108 disposed therein when viewed from the side of probe card 118 (not shown in FIG. 2), which is the side opposing the top view of the electromagnet of FIG. 2.

As shown, the laser displacement meters 120 are illustratively disposed at four locations around the end surface of the electromagnet 108 having a circular shape on the sides of the laser displacement meters 120 adjacent the outer side of the electromagnet. In order to be incorporated into a semiconductor parametric tester test head (e.g., the test head of the Keysight 4080 Series semiconductor parametric tester), the electromagnet 108 is designed in consideration of the following points. The electromagnet 108 generates a magnetic field in the region of the test head 110, and thus can exert an influence on an operation of an electrical circuit or a reed relay in the TH 110. In order to avoid such a malfunction, a magnetic circuit design is optimized so that the magnitude of a magnetic field in the z-axis direction (see z-axis of the coordinate system of FIG. 2) is equal to or less than approximately 0.5 mT in a distance range equal to or greater than approximately 130 mm in the x-y plane of the coordinate system of FIG. 2, and equal to or greater than 95 mm in the z-axis direction from the center of the end surface of the magnetic pole. In addition, as noted above, the electromagnet serves as a heat source due to generation of heat, and hence, when it is at a high in temperature, can exert an influence on a circuit operation or measurement itself. In order to avoid this, the chiller 106 is adapted to maintain a temperature of the electromagnet at the surface closest to the probe card 118 is less than approximately 30° Celsius.

Figure 3:
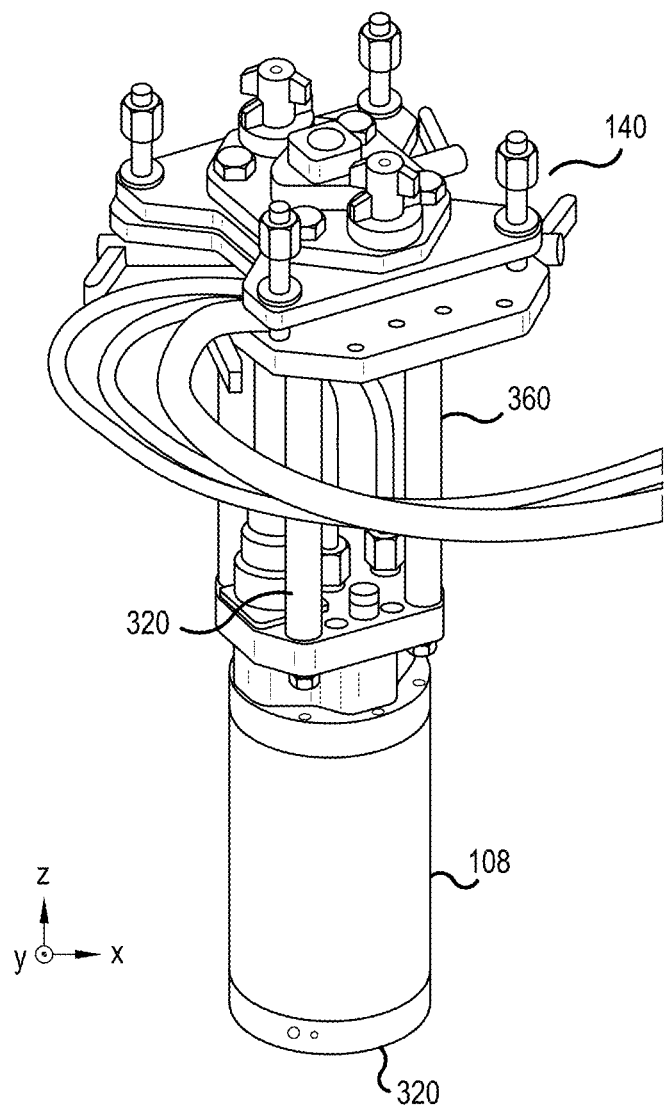
FIG. 3 is a perspective view of an electromagnet and an adjustment mechanism for adjusting the position and the orientation of the electromagnet of a system for MRAM testing according to a representative embodiment.

FIG. 3 is a perspective view of the electromagnet 108 and the electromagnet position adjustment mechanism 140 for adjusting the position and the orientation of the electromagnet 108 of a system for MRAM testing according to a representative embodiment. Various aspects and details of the electromagnet position adjustment mechanism 140 shown in FIG. 3 are common to those described above, and may not be repeated to avoiding obscuring the presently described representative embodiment.

The electromagnet position adjustment mechanism 140 comprises four columns 310 that provide support for the electromagnet 108 when connected to the electromagnet position adjustment mechanism 140. Moreover, the columns 310 are provided to ensure sufficient distance between the selected electromagnet and the fixing mechanism. As alluded to above and described more fully below, the center position of the magnet pole is beneficially disposed substantially directly above the MTJ of the MRAM wafer being tested. As such, the magnetic pole in the region of a lower surface 320 of the electromagnet disposed above the probe card 118 must be aligned to be in this position during wafer testing. The electromagnet position adjustment mechanism 140 is thus adapted to adjust the position in x, y, z and θ of the coordinate system of FIG. 3, where θ is an angle of inclination of the lower surface 320 with respect to the x,y plane. Adjustment of the orientation of the electromagnet 108 is described more fully below. It is contemplated that the adjustments may be made either manually, or remotely through an interface (not shown) to the system controller 136 or other computer component. Just by way of illustration, the electromagnet position adjustment mechanism 140 may comprise a stepper motor or other similar device adapted to move the magnet in the x, y, z and θ directions as shown.

Figure 4A:
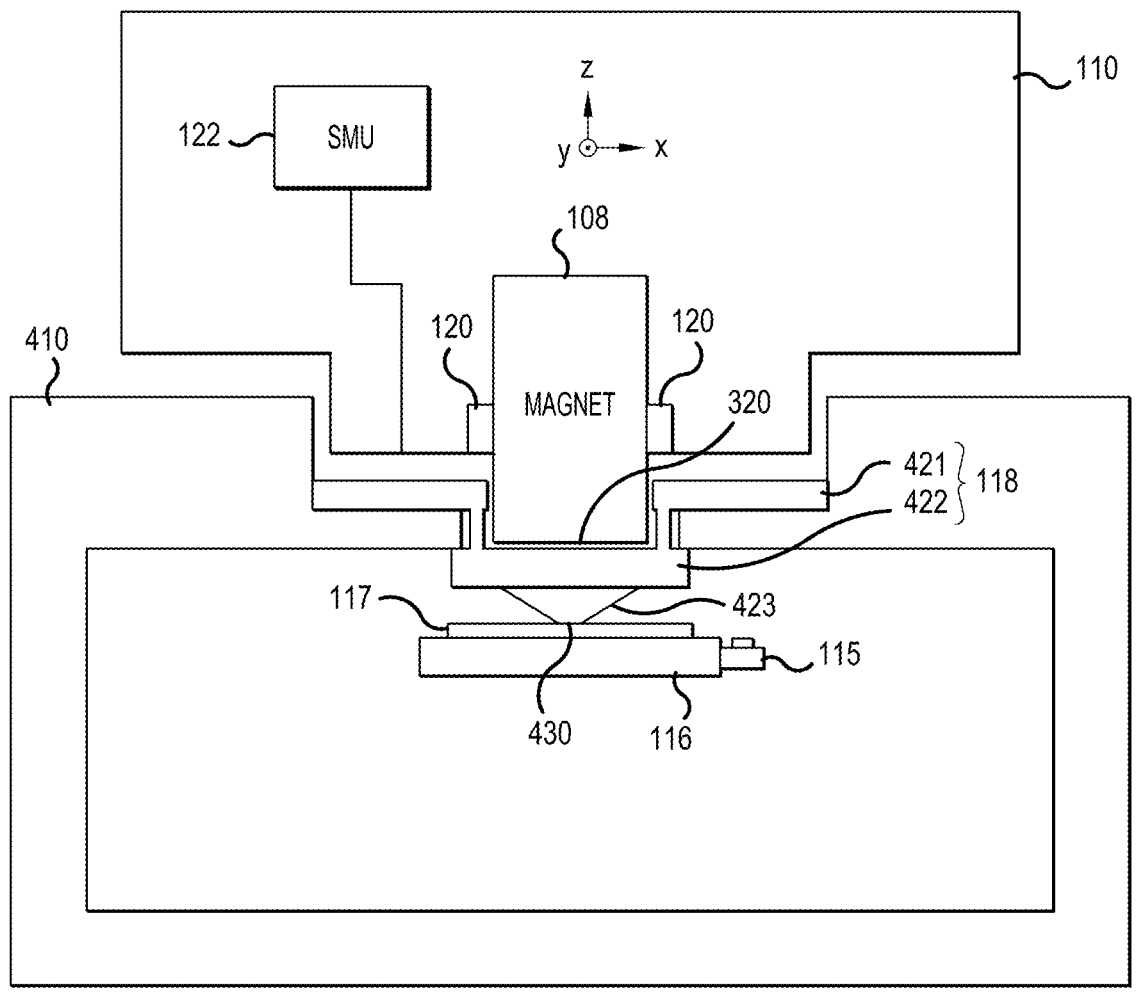
FIG. 4A is a simplified block diagram of a test head disposed over a prober in a docked position for testing an MRAM semiconductor wafer in accordance with a representative embodiment.

FIG. 4A is a simplified block diagram of the test head 110 in a docked position disposed over a prober 410 for testing an MRAM semiconductor wafer in accordance with a representative embodiment. Various aspects and details of the test head 110 and the prober 410 are common to those presented above in connection with the descriptions of FIGS. 1-3. These common aspects and details may not be repeated to avoid obscuring the presently described representative embodiment.

To ensure a sufficiently high maximum magnetic field from the electromagnet 108 to the DUT, probe card 118 comprises two "floors" 421, 422. Notably, the two floors enable the lower surface 320 of the electromagnet 108 to be positioned in the z-direction at close distance to provide a high magnetic field strength. Notably, the two-floor probe card beneficially enables a comparatively high magnetic field to be realized. The ability to more accurately position the lower surface 320 of the electromagnet 108 in comparatively close proximity to wafer 117 beneficially improves the testing of the semiconductor MRAM devices. To this end, in an MRAM test involving application of the electromagnet 108, an actual distance/separation (z-direction in the coordinate system of FIG. 4A) from the electromagnet 108 to the MRAM device (i.e., wafer 117) influences the magnitude of the strength of a magnetic field exerted. As such, in the measurement on each MRAM device of the wafer 117, impacts the reproducibility of the strength of the magnetic field applied to the MRAM device actually occurs, due to, for example, a tolerance of a thickness of a wafer. Accordingly, accurately locating the lower surface 320 of the electromagnet 108 plays a vital realizing the desired magnetic field at the wafer 117, which in turn impacts the reproducibility and quality of the testing of MRAM devices across the wafer 117. Notably, the "desired" magnetic field is the value of the field as set.

In accordance with a representative embodiment, the z-height of the electromagnet 108 and thus the location of the lower surface 320 relative to an upper surface of the wafer 117 is determined using the laser displacement meters 120. The desired distance between the lower surface 320 relative and the upper surface of the wafer 117 is realized using electromagnet position adjustment mechanism 140 to raise/lower the magnet to the desired position to realize the desired magnetic field strength. In accordance with a representative embodiment, readings from the laser displacement meters 120 are used to set the position of the electromagnet 108 in the z-direction. This positioning of the electromagnet is illustratively carried out manually . . . Further details of placement of the electromagnet at a desired height to provide a desired magnetic field strength at the wafer 117 is described more fully below in connection with representative embodiments described in connection with FIGS. 7A and 7B.

Figure 4B:
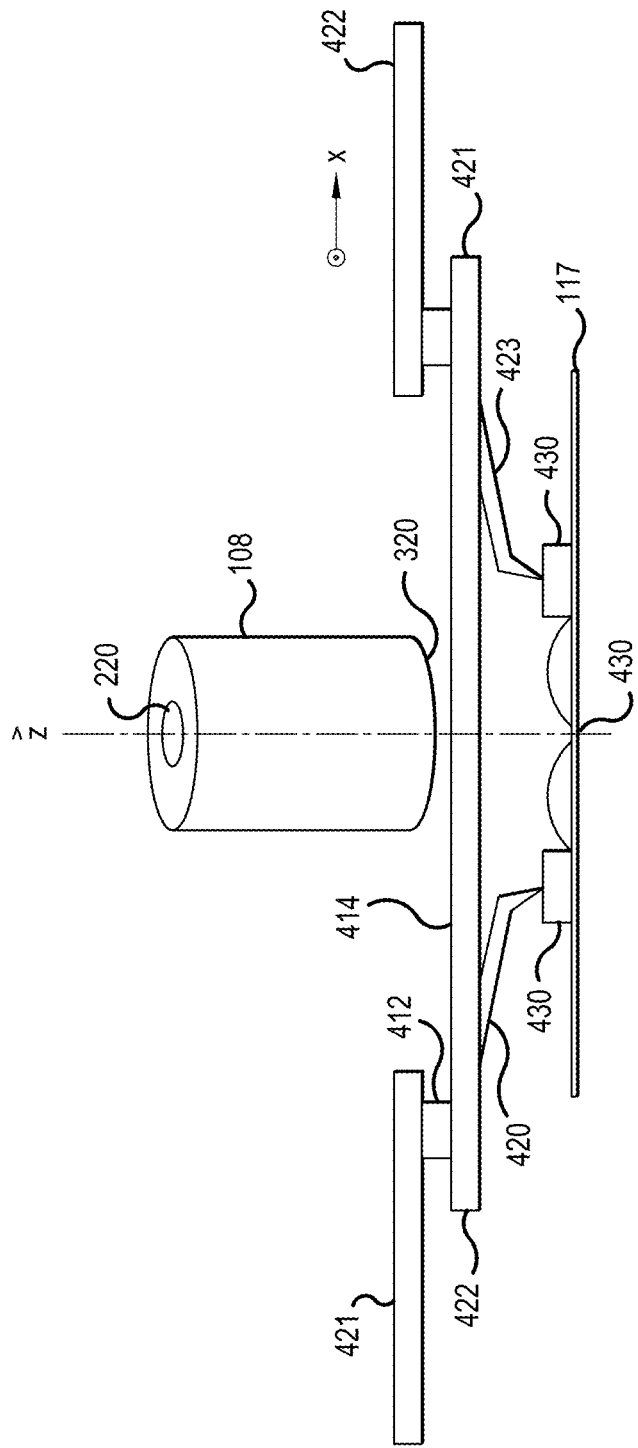
FIG. 4B is a cross-sectional view of the test head of FIG. 4B.

FIG. 4B is a cross-sectional view of the test head 110 of FIG. 4A. Various aspects and details of the test head 110 and the prober 410 are common to those presented above in connection with the descriptions of FIGS. 1-4A. These common aspects and details may not be repeated to avoid obscuring the presently described representative embodiment.

As noted above, to provide the desired electromagnetic field strength at the upper surface of the wafer 117, the center of the electromagnet 108 is aligned in the x-y plane of the coordinate system of FIG. 4B with the center 220 of the probe card needles 423 whose position corresponds to the DUT. The positions are aligned ("matched") because a prober makes the wafer 117 on chuck move to contact to the probe card needles 423.

Figure 4C:
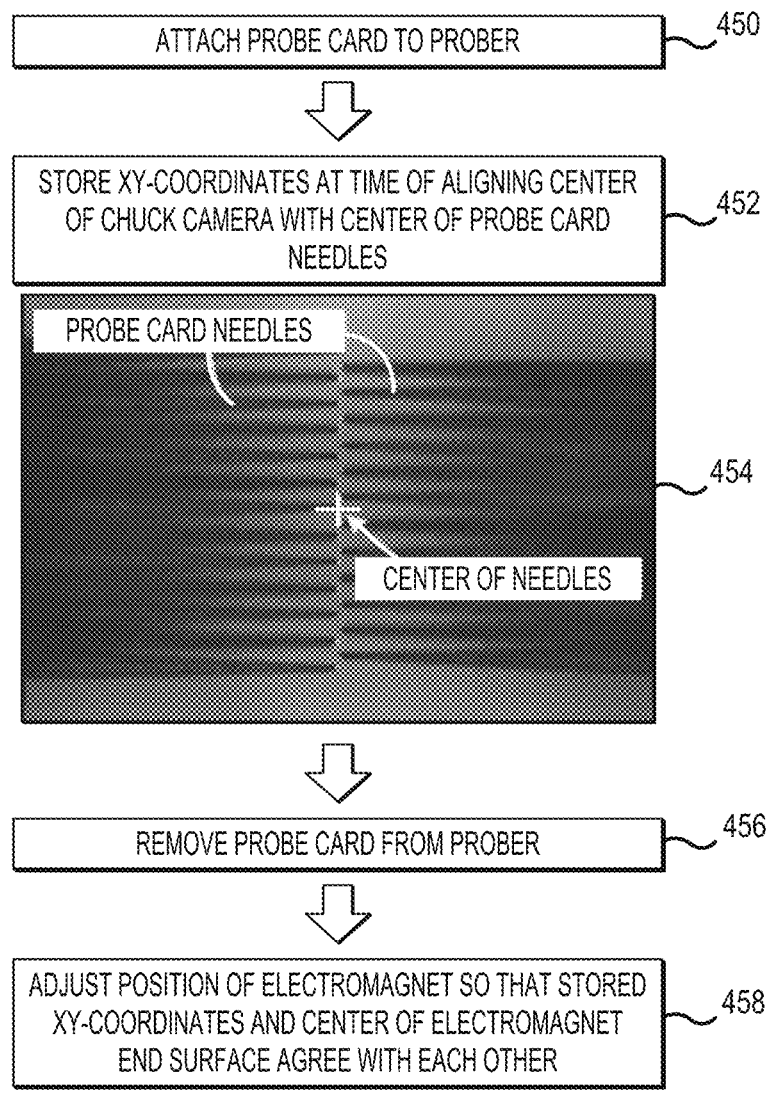
FIG. 4C is a flow-diagram showing the positioning of a electromagnet relative to a semiconductor wafer for MRAM testing in accordance with a representative embodiment.
Figure 4C:
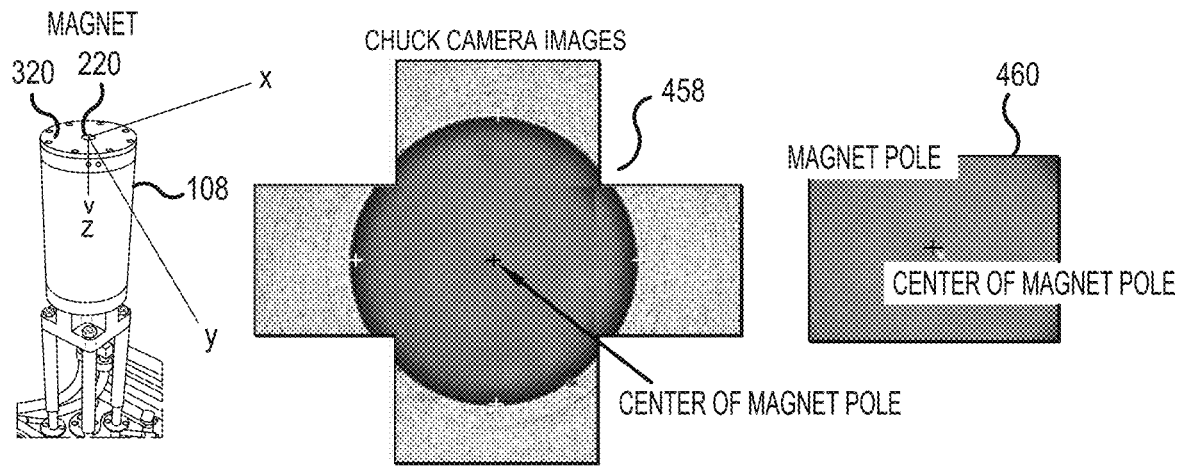

FIG. 4C is a flow-diagram showing the positioning of the electromagnet 108 relative to the probe card needles whose position corresponds to DUTs on a semiconductor wafer 117 ("wafer") for MRAM testing in accordance with a representative embodiment. Various aspects and details of the flow-diagram are common to those presented above in connection with the descriptions of FIGS. 1-4B. These common aspects and details may not be repeated to avoid obscuring the presently described representative embodiment.

Notably, FIG. 4C provides further details of the locating of the center of electromagnet 108 to the center of the probe card needles 423. At 450, the probe card 118 is attached to the prober 410. At 452, the x,y coordinates (see FIGS. 4A, 4B) at the time when the center of the chuck camera 115 is aligned with the center of the probe card needles 423 are stored, for example in memory of the system controller 136. As noted above, the probe card needles 423 are located equidistant from the center of the wafer 117, and as such the x,y coordinates stored at this point identify the center of the wafer 117 as well. At 454 a photograph from the chuck camera showing the probe card needles and their center. For purposes of illustration, in accordance with a representative embodiment, there are 25 probe card needles in a single row, so the position of the center of the probe card needles corresponds to the 13$^{th}$ needle.

At 456 the probe card is removed from the prober 410 to prevent breaking the probe card by colliding with the chuck. Notably, because the position is adjusted while checking the lower surface 320 of the electromagnet 108 with the chuck camera 115, there is a possibility that the probe card could collide with the chuck and break a needled if the probe card were still attached.

At 458, the electromagnet 108 is moved by the electromagnet position adjustment mechanism 140 to the x,y coordinates stored in 452 until the center 220 of the lower surface 320 of the electromagnet are located at the same x,y position. As shown at 458 and 460, chuck camera images show the center of the magnet pole, which is at the same x,y coordinates as the center of the wafer 117.

So, the XY-coordinates of the chuck at a time of causing the center of the chuck camera to agree with the center of the probe card needles 423 of the probe card, that is, the center position of a region of the probe card in which the opposing needles are installed, are stored. Next, the probe card is removed from the prober, and the position of the electromagnet is adjusted so that the stored XY-coordinates and the center of the electromagnet end surface agree with each other. The position alignment of the electromagnet in the Z-direction is performed using of the chuck camera of the prober. As noted above, the chuck camera is focused on tips of the probe needles of the probe card, and the position of the chuck is raised therefrom by a predetermined distance in the Z-direction. The Z-position of the electromagnet position adjustment mechanism is adjusted so that the chuck camera in a raised state is focused on the lower surface 320 of the electromagnet. As such, the distance of the electromagnet 108 from the tips of the probe card needles 423 of the probe card in the Z-direction can be adjusted to a predetermined value. In addition, the distance of the electromagnet in the Z-direction is adjusted at three or more points on the lower surface 320 in the same manner, to thereby be able to adjust the θ-axis of the electromagnet position adjustment mechanism (where θ represents the angle of an inclination of the lower surface 320 of the electromagnet with respect to the prober chuck surface).

Figure 5A:
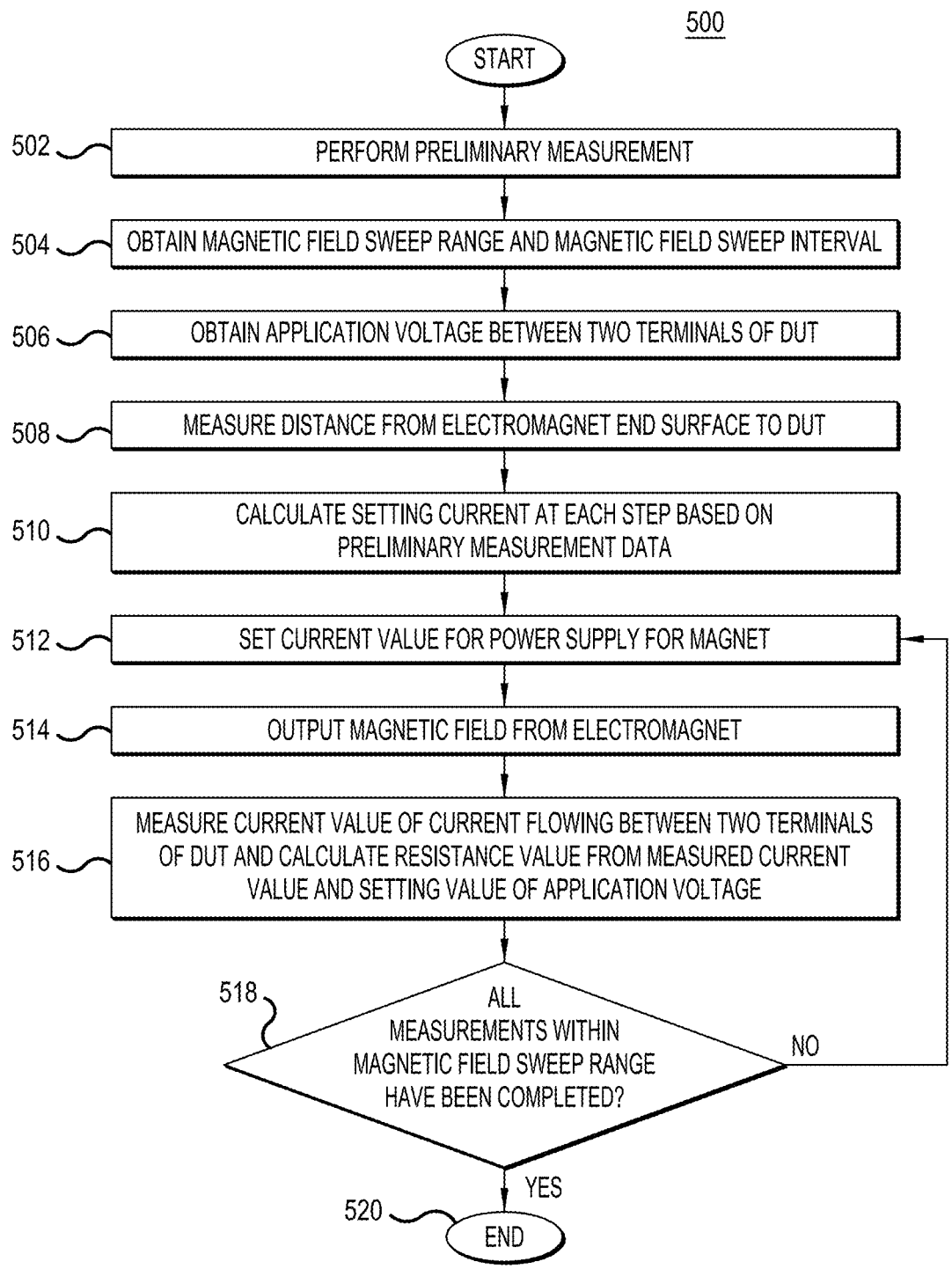
FIG. 5A is a flow-diagram of a method of testing an MRAM wafer in accordance with a representative embodiment.

FIG. 5A is a flow-diagram of a method 500 of testing an MRAM wafer in accordance with a representative embodiment. Various aspects and details of the flow-diagram are common to those presented above in connection with the descriptions of FIGS. 1-4B. These common aspects and details may not be repeated to avoid obscuring the presently described representative embodiment. Notably, various aspects of the method 500 are contemplated to be completed by execution of instructions (executable code) by a processor of the system controller 136 described above.

At 502 preliminary measurements are carried out. These preliminary measurements are described more fully below in connection with a representative embodiment described in connection with FIGS. 6A~6C.

At 504 the system 100 acquires a desired magnetic field sweep range and a magnetic field sweep interval (magnetic field sweep step width) to be used for measuring the RH curve of the wafer 117. The magnetic field sweep is done to identify coercive force of a magnetic tunnel junction. The magnetic field sweep range should cover the coercive force. Also, the magnetic field sweep interval determines the resolution of the coercive force measurement. Notably, the magnetic field sweep range and magnetic field sweep interval may be stored in memory in the system controller 136 and are used by the system controller to carry out the desired testing of the MRAM devices of the wafer 117.

At 506 the value of the voltage to be applied between the terminals of the DUT is during a test is acquired from memory and used by the system controller to set the voltage at the wafer 117 for each MRAM device tested.

At 508 a distance $Z_0$ ("d" in FIG. 1) from the lower surface 320 of the electromagnet 108 to the upper surface of the wafer under test (DUT) is determined.

At 510 a a desired applied magnetic field $Hz_0$ at each sweep step is calculated from the magnetic field sweep range and the magnetic field sweep step width, and at 512 the desired current value setting value $I_0$ of the coil current corresponding to the desired magnetic field $Hz_0$ is obtained from the preliminary measurement data.

At 514 the electromagnet 108 is activated at the coil current value $I_0$ corresponding to each sweep step from based on a command from the system controller 136 to the power supply 104 so the electromagnet 108 can generate the desired magnetic field strength.

At 516, the above-mentioned application voltage is applied between the two terminals of the MRAM device by the SMUs of the tester to measure a current flowing between the two terminals, and the resistance value is calculated from the measured current value and the setting value of the application voltage between the two terminals.

At 518, the determination is made whether or not all measurements back and forth within the magnetic field sweep range have been completed. If not, the method returns to 512 and repeated until all measurements have been made.

Figure 5B:
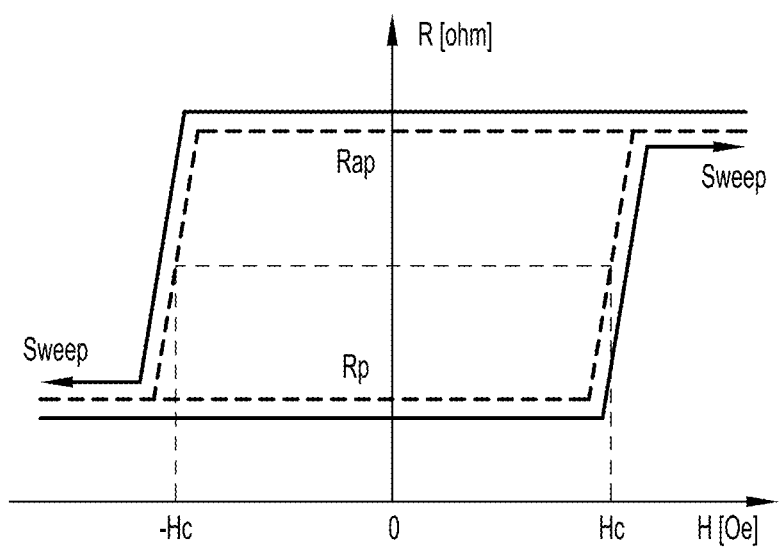
FIG. 5B is a graph of resistance versus coercive force values generated in testing an MRAM wafer using the system and method of a representative embodiment.

FIG. 5B is a graph of resistance (R) versus coercive force values generated in testing an MRAM wafer using the system and method of a representative embodiment. Various aspects and details of the flow-diagram are common to those presented above in connection with the descriptions of FIGS. 1-5A. These common aspects and details may not be repeated to avoid obscuring the presently described representative embodiment.

As shown, coercive force values Hc and −Hc of the MTJ can be acquired by being determined from a transition of the strength of the magnetic field of the measurement data.

In addition, high resistance state of an anti-parallel resistance (Rap) with the reverse direction of magnetization and low resistance state of parallel resistance (Rp) with the same direction of magnetization can be acquired from a transition of the resistance value R. Furthermore, the resistance ratio (magneto-resistance ratio) can be calculated from MRratio= (Rap−Rp)/Rp, and can be used for an evaluation of the MTJ.

Figure 6A:
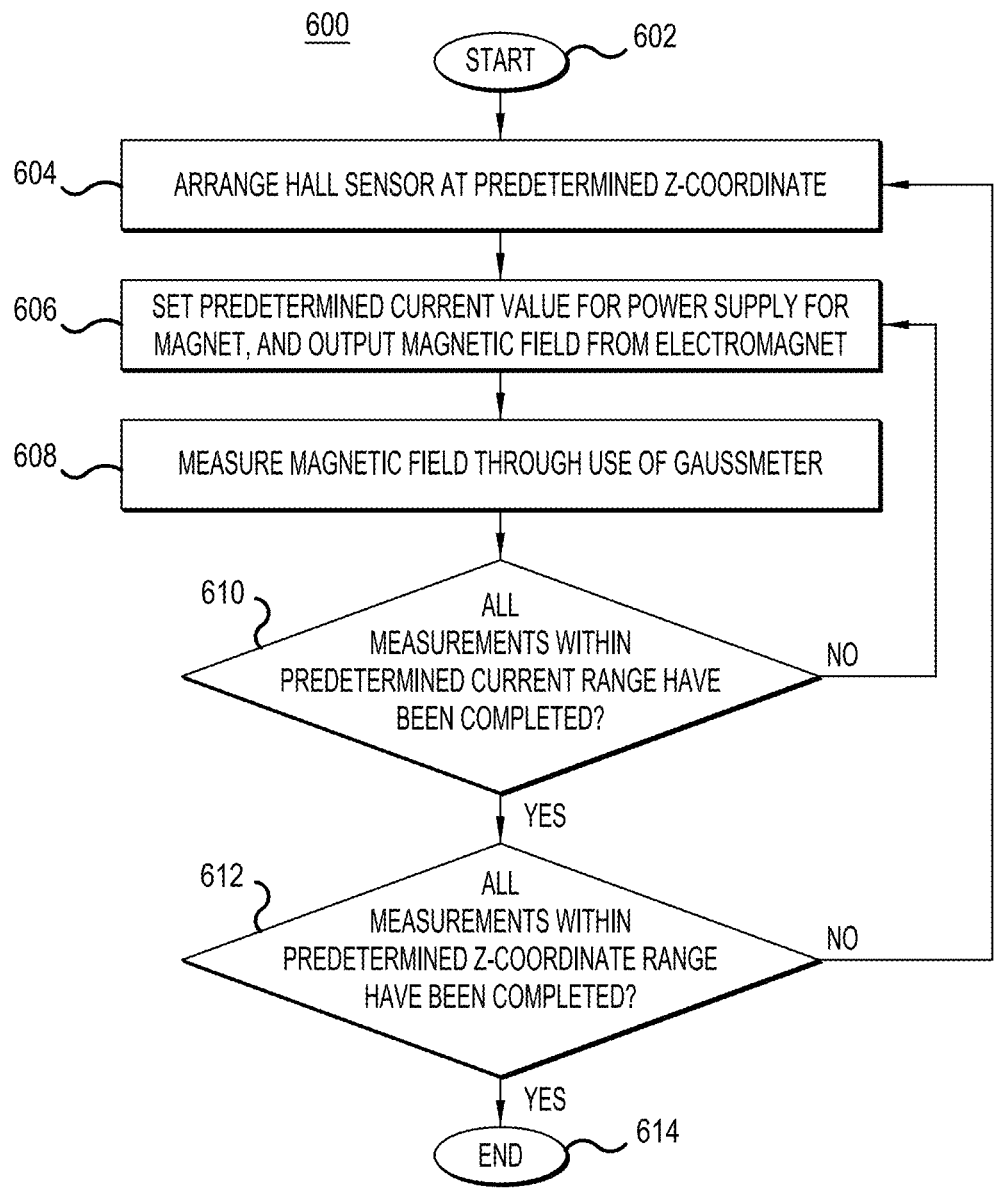
FIG. 6A is a flow-diagram of a preliminary measurement conducted in accordance with a representative embodiment.

FIG. 6A is a flow-diagram of a preliminary measurement conducted in accordance with a representative embodiment. Various aspects and details of the flow-diagram are common to those presented above in connection with the descriptions of FIGS. 1-5B. These common aspects and details may not be repeated to avoid obscuring the presently described representative embodiment.

The method 600 starts at 602. The method comprises gathering magnetic field data using the "distance from the magnetic pole surface" and the "coil current values." The method This is carried out with the test head in a state of not being docked with the prober (maintenance position).

Figure 6B:
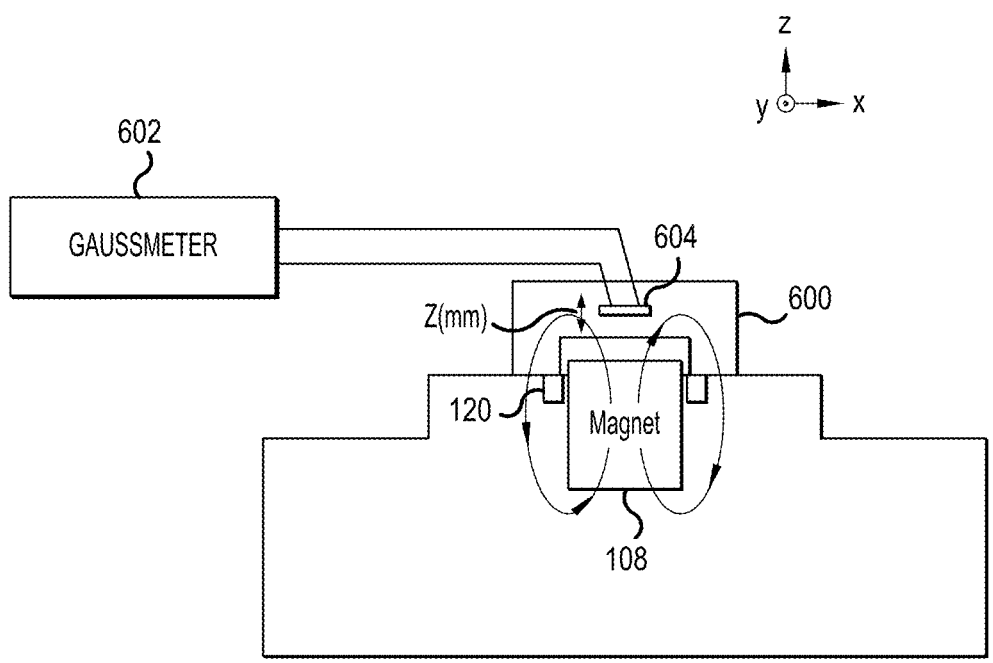
FIG. 6B is a conceptual view of a calibration fixture for a system for testing an MRAM wafer in accordance with a representative embodiment.

At 604 a Hall sensor (see FIG. 6B) is disposed at a predetermined height (z-axis in FIG. 6B). A flat plate called "magnetic pole surface plate" is attached on a magnetic pole surface (i.e., the lower surface 320) of the electromagnet 108 the "distance from the displacement meter to the magnetic pole." The magnetic field calibration fixture (see FIG. 6B) is attached on the test head, and the Hall sensor in the automatic stage is moved to a reference position (the center of the end surface of the electromagnet being the XY-position and a predetermined reference position being the Z-position) to measure the "distance of the Hall sensor (at the reference position) from the displacement meter" at the reference position. The predetermined x,y,z positions are set by before shipment of the system 100, and not by the the user. The x,y-position of the Hall sensor is substantially the same as the center of the electromagnet 108. The z-position is approximately the same value as the distance between the lower surface of the electromagnet 108 and the wafer 117 (DUT) during wafer measurement. In accordance with a representative embodiment, the absolute value of the z-position is measured with a displacement meter and does not need to be strictly controlled. The "distance from the magnetic pole to the Hall sensor (at the reference position)" is calculated from the measured values with the laser displacement meters. Thus, the absolute value of the distance on the Z-axis is found, and hence, the automatic stage is controlled with this value being used as a reference point, to thereby be able to arrange the Hall sensor so that the Hall sensor has any desired "distance from the magnetic pole to the Hall sensor." Notably, the maximum magnetic field strength is obtained at the lower surface 320 of the electromagnet 108 (i.e., z=0).

At 606 predetermined values for the power supply 104 are applied by the power supply 104 to the electromagnet 108. The predetermined values are set before shipment of the system 100 and the magnetic field strength beneficially covers a comparatively wide range. While this requires a comparatively large coil current range, this is limited by a maximum current than can flow through the coils of the electromagnet 108.

At 608 a gaussmeter (see FIG. 6B) is used to measure the magnetic field strength at the coil current provided from the power supply 104 at 606.

At 610 measurements within a predetermined range are carried out to determine the magnetic field strength.

Figure 6C:
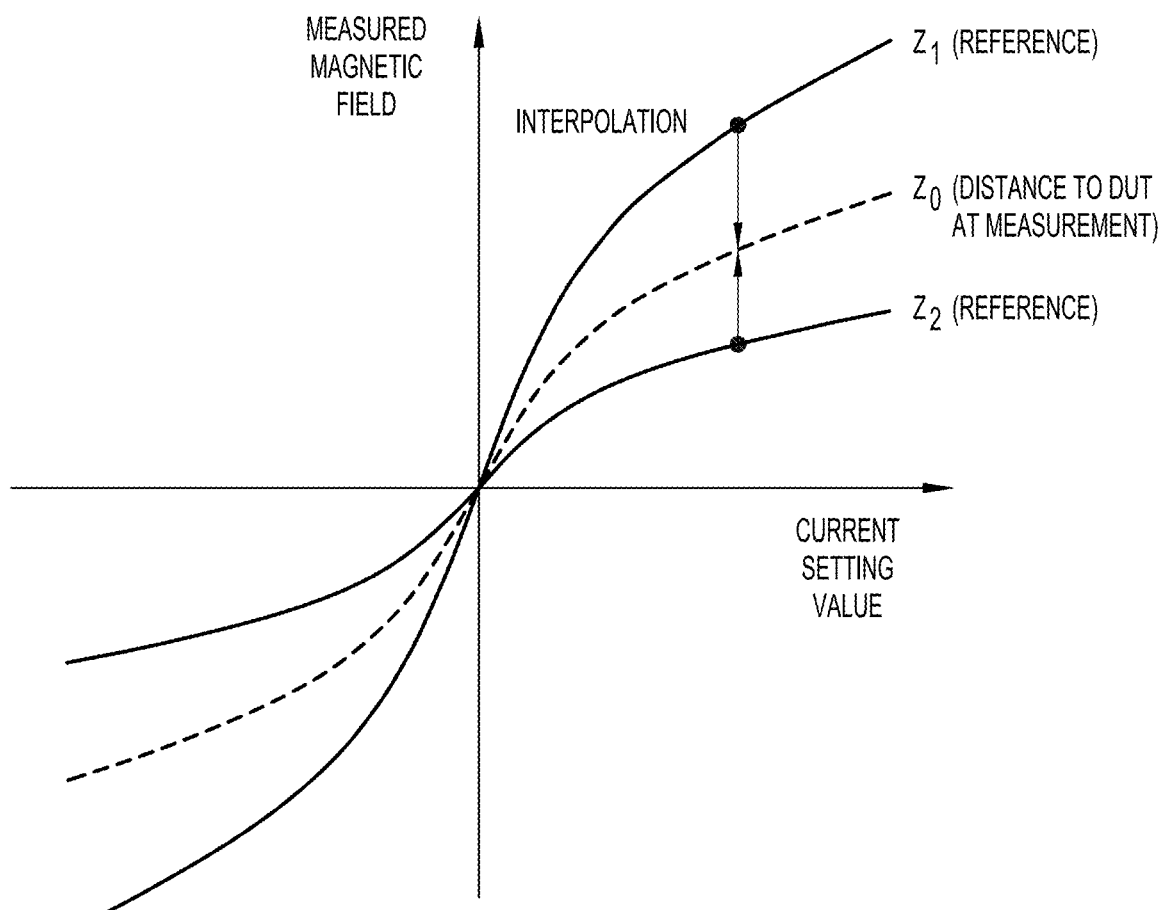
FIG. 6C is a graph of magnetic field strength versus applied coil current at different height positions in accordance with a representative embodiment.

At 612 measurements of the magnetic field strength within a predetermined z-coordinate (height) range are carried out to provide, for each predetermined z-coordinate, the magnetic field strength versus coil current (see FIG. 6C). Specifically, the magnetic field measurement is executed by the Hall sensor while changing the output current value of the power supply for the electromagnet at a time of controlling the "coil current value" and changing a movement amount of the automatic stage of the magnetic field calibration fixture from the reference point in the Z-direction at a time of controlling the "distance from the magnetic pole," to thereby be able to acquire the data on the "strength of the magnetic field" using the "distance from the magnetic pole" and the "coil current value" as variables (see FIG. 6B).

FIG. 6B is a conceptual view of a calibration fixture for a system for testing an MRAM wafer in accordance with a representative embodiment. Various aspects and details of the flow-diagram are common to those presented above in connection with the descriptions of FIGS. 1-6A. These common aspects and details may not be repeated to avoid obscuring the presently described representative embodiment.

As shown, the calibration fixture 610 comprises a Hall sensor 604 and a gaussmeter 602 disposed over the electromagnet 108. A magnetic field is generated and the distance to the Hall sensor is determined. Magnetic field data versus height (z-axis) are gather and the distance (Z=Z0) from the magnet to DUT (upper surface of wafer 117) is determined using the measured distance with the laser displacement meters 120. The magnetic field data for the wafer measurement are created with the magnetic field reference data using linear interpolation (see FIG. 6C). For example, if Z0=5.10 mm, the magnetic field data for the DUT (B (Z=5.10 mm, I)) is created with reference data (B(Z=5.00 mm, I) and B (Z=5.25 mm, I).

The user can set the magnetic field range and the sweep step for RH measuremente.g. −600 mT, −595 mT, −590 mT, . . . , +595 mT, +600 mT. The set magnetic field range (and step) is used to set coil current range (and step) by referring to magnetic field data for the particular wafer (DUT).

The magnetic field calibration fixture of FIG. 6B is structured to be attachable on the pogo pin side of the test head of the parametric tester, and is formed mainly of an XYZ-axis or three-axis automatic stage and a Hall sensor for a magnetic field calibration. The Hall sensor is connected to a gaussmeter, and can measure the magnetic field strength under control of the system controller. Through the control of the automatic stage, it is possible to move and arrange the Hall sensor to/at any position including the Z-position and measure the output magnetic field of the electromagnet. As an example of the automatic stage, YA05A-R202 and ZA05A-W101, which are manufactured by Kohzu Precision Co., Ltd., can be used as a stage main body, and CRUX-D, which is manufactured by Kohzu Precision Co., Ltd., can be used as a stage controller. As an example of the Hall sensor, FP-2X-250-AS05M, which is manufactured by Lake Shore Cryotronics, Inc., can be used as a Hall sensor main body, and F71, which is manufactured by Lake Shore Cryotronics, Inc., can be used as the gaussmeter. These instrument examples are not intended to limit the present invention. Next, the magnetic field calibration method using the magnetic field calibration fixture is described. A spatial magnetic field strength distribution in a space in which an electromagnet is present depends on a large number of parameters. These parameters include, for example, a relative coordinate with respect to the magnetic pole (end surface of the electromagnet), the coil current value of the electromagnet, presence or absence of a magnetic substance in the space, and a coil temperature of the electromagnet. In the magnetic field calibration method for this system, the absolute value of the relative coordinate with respect to the magnetic pole on the Z-axis, that is, the "distance from the magnetic pole (equivalently, distance from the center of the lower surface of the electromagnet)," and the "current value of a current flowing through the coil (coil current value)" are considered the dominant parameters.

In order to obtain the strength of the magnetic field applied to the device under test (DUT (MRAM device)) at a time of a wafer measurement, data on the "strength of the magnetic field" using the "distance from the magnetic pole" and the "coil current value" as variables is prepared in advance, to thereby be able to calculate, from the "distance of the DUT from the magnetic pole" and the "desired applied magnetic field strength" under conditions at a time of a DUT measurement, the "coil current value" that satisfies these conditions. To that end, in order to obtain the strength of the magnetic field applied to the DUT, a preliminary measurement regarding the data on the "strength of the magnetic field" using the "distance from the magnetic pole" and the "coil current value" as variables is required before the DUT measurement.

FIG. 6C is a graph of magnetic field strength versus applied coil current at different height positions in accordance with a representative embodiment. Various aspects and details of the flow-diagram are common to those presented above in connection with the descriptions of FIGS. 1-6B. These common aspects and details may not be repeated to avoid obscuring the presently described representative embodiment.

As shown, two curves show the measured preliminary magnetic field strength at heights z1 and z2 those represent the distance between the lower surface of the electromagnet 108 and the Hall sensor. Notably, based on these data, magnetic field strength versus coil current with the distance Z0 which is the distance between the he lower surface of the electromagnet 108 and the upper surface of the wafer 117 can be calculated using linear interpolation or other curve fitting methods.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for measuring a resistance (R)-magnetic field (H) curve of an magnetoresistive random-access memory (MRAM) device, the system comprising:

a calibration fixture adapted to provide initial measured magnetic field data for setting a measured distance and a coil current of a coil of an electromagnet for a plurality of magnetic field strengths at a plurality of predetermined distances from an end surface of the electromagnet;

a power supply adapted to provide the coil current to the electromagnet;

a laser displacement meter adapted to measure a distance from the end surface of the electromagnet to a device under test (DUT), wherein the electromagnet is adapted to generate magnetic fields at a predetermined magnetic field sweep interval within a magnetic field sweep range from a value of a first magnetic field strength of the plurality of magnetic field strengths to a value of a second magnetic field strength of the plurality of magnetic field strengths, and sweep back and forth between the first magnetic field strength and the second magnetic field strength;

a test head comprising source measurement unit (SMU) adapted to determine, for each of the plurality of magnetic field strengths of the generated magnetic fields, a resistance of the DUT from a value of a current measured from the DUT, and to set a value of a predetermined voltage that has been applied to the DUT therebetween;

a processor; and a memory that stores instructions, which when executed by the processor, causes the processor to:

determine a resistance value of a magnetic tunnel junction of the DUT from a value of the measured current and a setting value of the predetermined voltage that has been applied; and measure the RH curve from the resistance value of the DUT for each of the plurality of magnetic field strengths; and generate the magnetic fields by setting the coil current by determining, from the initial measured magnetic field data, coil current values of the coil to be caused to flow through the coil of the electromagnet of the plurality of magnetic field strengths at the plurality of predetermined distances from the end surface of the electromagnet.

2. The system of claim 1, wherein the calibration fixture is adapted to measure advance values by locating a Hall element at the measured distance from an end surface of the electromagnet using the laser displacement meter comprising three axis staging.

3. The system of claim 1, wherein the instructions further cause the processor to determine a coercive force of the DUT and calculate a magnetoresistance ratio (MR).

4. The system of claim 1, further comprising a system controller adapted to set predetermined voltage to be applied between a first terminal and a second terminal of the DUT and measuring of current flowing between the first terminal and the second terminal are performed through use of a source measure unit.

5. The system of claim 1, wherein advance values of the coil current flowing through the coil of the electromagnet for the plurality of magnetic field strengths are measured at the plurality of predetermined distances from the end surface of the electromagnet by locating a Hall element at the plurality of predetermined distances from the end surface of the electromagnet and measuring the plurality of magnetic field strengths with a Gaussmeter.

6. The system of claim 1, wherein the setting values of the current of the coil of the electromagnet is set by obtaining the coil current corresponding to the plurality of magnetic field strengths of the generated magnetic fields through interpolation from a plurality of results of measured in advance.

7. The system of claim 1, further comprising at least four laser displacement meters arranged around an end surface of the electromagnet to determine a measurement of the distance from the end surface of electromagnet to the DUT.

8. The system of claim 7, further comprising an electromagnet position adjustment mechanism that is adjustable along four axes (x, y, z, θ) adapted to support the electromagnet, wherein the e-axis is an angle of an inclination of the end surface of the electromagnet with respect to an x-y plane.

9. The system of claim 8, further comprising a chuck of a wafer prober adapted to hold the DUT; and a chuck camera attached to the chuck and adapted to photograph the electromagnet wherein the four axes are subjected to position adjustment by the electromagnet position adjustment mechanism through use of: a chuck camera which is attached to the chuck, and is adapted to photograph the electromagnet and the at least four laser displacement meters.

10. The system of claim 9, wherein a position of a center of the end surface of the electromagnet is aligned with a center of chuck coordinates of the wafer prober.

11. The system of claim 8, wherein the electromagnet and the electromagnet position adjustment mechanism are disposed in a center hole formed in a test head of a semiconductor parametric tester.

12. The system of claim 1, wherein the electromagnet comprises a thermocouple attached thereto, and the instructions further cause the processor to stop outputting the coil current when a coil temperature of the electromagnet exceeds a predetermined threshold value.

13. A method measuring a resistance-magnetic (RH) field curve of a magnetoresistive random access memory (MRAM), the method comprising:

measuring initial values of a coil current flowing through a coil of an electromagnet for a plurality of magnetic field strengths at a plurality of predetermined distances from an end surface of the electromagnet;

measuring a distance from the end surface of the electromagnet to a DUT through use of a laser displacement meter;

generating magnetic fields at a predetermined magnetic field sweep interval within a magnetic field sweep range from a value of a first magnetic field strength of the plurality of magnetic field strengths to a value of a second magnetic field strength of the plurality of magnetic field strengths, and sweeping back and forth between the first magnetic field strength and the second magnetic field strength, wherein the generating magnetic fields comprises setting the coil current, which is determined with the initial value at the predetermined distances to the DUT from the end surface of the electromagnet;

determining a resistance value of a magnetic tunnel junction of the DUT from a value of a measured current and a setting value of a predetermined voltage that has been applied; and determining the RH curve from the resistance value of the magnetic tunnel junction of the DUT for each of the plurality of magnetic field strengths.

14. The method of claim 13, further comprises determining a coercive force of the DUT determining a magnetoresistance ratio.

15. The method of claim 13, wherein the measuring initial values of the coil current flowing through the coil of the electromagnet for the plurality of magnetic field strengths at the plurality of predetermined distances from the end surface of the electromagnet comprises arranging a Hall element at the plurality of predetermined distances from the end surface of the electromagnet and measuring the plurality of magnetic field strengths.

16. The method of claim 13, wherein calculating of a setting value of the coil current flowing through the coil of the electromagnet comprises obtaining the coil current corresponding to a magnetic field strength of the generated magnetic fields through interpolation from a plurality measured in advance.

17. The method of claim 13, wherein the measuring the distance from the end surface of the electromagnet to the DUT comprises arranging at least four laser displacement meters around the end surface of the electromagnet and taking measurements.

18. The method of claim 17, further comprising supporting the electromagnet above the DUT with a electromagnet position adjustment mechanism that is adjustable along four axes (x,y,z,θ), where the θ-axis is an angle of an inclination of the end surface of the electromagnet with respect to an x,y-plane.

19. The method of claim 18, further comprising:
holding the DUT is on a chuck of a wafer prober, and
adjusting a position of the electromagnet along the four axes with the electromagnet position adjustment mechanism, which comprises a chuck camera attached to the chuck and the four laser displacement meters.

* * * * *